US010932292B2

(12) United States Patent
Ryu et al.

(10) Patent No.: US 10,932,292 B2
(45) Date of Patent: Feb. 23, 2021

(54) METHOD FOR TRANSMITTING FRAME IN WIRELESS LAN SYSTEM, AND WIRELESS TERMINAL USING SAME

(71) Applicant: LG ELECTRONICS INC., Seoul (KR)

(72) Inventors: Kiseon Ryu, Seoul (KR); Suhwook Kim, Seoul (KR); Jeongki Kim, Seoul (KR); Hyunhee Park, Seoul (KR); Hangyu Cho, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 277 days.

(21) Appl. No.: 16/304,669

(22) PCT Filed: May 17, 2017

(86) PCT No.: PCT/KR2017/005105
§ 371 (c)(1),
(2) Date: Nov. 26, 2018

(87) PCT Pub. No.: WO2017/204484
PCT Pub. Date: Nov. 30, 2017

(65) Prior Publication Data
US 2020/0329495 A1    Oct. 15, 2020

Related U.S. Application Data

(60) Provisional application No. 62/341,086, filed on May 25, 2016.

(51) Int. Cl.
H04W 74/08    (2009.01)
H04L 5/00     (2006.01)
(Continued)

(52) U.S. Cl.
CPC ....... *H04W 74/0808* (2013.01); *H04L 5/0094* (2013.01); *H04W 72/0446* (2013.01);
(Continued)

(58) Field of Classification Search
CPC ............. H04W 72/04; H04W 74/0808; H04W 72/0446; H04W 76/11; H04W 74/08;
(Continued)

(56) References Cited

U.S. PATENT DOCUMENTS

2016/0080122 A1    3/2016  Oh et al.
2019/0029041 A1*   1/2019  Tomeba ................ H04W 72/04
(Continued)

FOREIGN PATENT DOCUMENTS

WO    2015023103    2/2015
WO    2015064943    5/2015
WO    2016060448    4/2016

OTHER PUBLICATIONS

PCT International Application No. PCT/KR2017/005105, International Search Report dated Aug. 18, 2017, 4 pages.
(Continued)

Primary Examiner — Brian D Nguyen

(57) ABSTRACT

A method for transmitting a frame in a wireless LAN system according to an embodiment of the present specification comprises a step of transmitting, by a wireless terminal, a trigger frame including identification information for a plurality of user STAs and resource information indicating resource units separately allocated to the plurality of user STAs, wherein, when the trigger frame is an MU RTS frame, the resource information is configured: on the basis of first to fourth index values in a fourth index range in order to indicate a primary 20 MHz channel through which a CTS frame, a response to the MU RTS frame, is to be transmitted; on the basis of fifth and sixth index values in a fifth index
(Continued)

range in order to indicate a primary 40 MHz channel through which the CTS frame is to be transmitted; and on the basis of a seventh index value in a sixth index range in order to indicate a primary 80 MHz channel through which the CTS frame is to be transmitted.

11 Claims, 17 Drawing Sheets

(51) Int. Cl.
 *H04W 72/04* (2009.01)
 *H04W 76/11* (2018.01)
 *H04W 84/12* (2009.01)
(52) U.S. Cl.
 CPC ........ *H04W 72/0453* (2013.01); *H04W 76/11* (2018.02); *H04W 84/12* (2013.01)
(58) Field of Classification Search
 CPC . H04W 74/00; H04W 72/0453; H04W 84/12; H04L 5/0094
 See application file for complete search history.

(56) References Cited

U.S. PATENT DOCUMENTS

| | | | |
|---|---|---|---|
| 2019/0342917 A1* | 11/2019 | Liu | H04W 28/20 |
| 2020/0187254 A1* | 6/2020 | Shinohara | H04B 7/0452 |
| 2020/0236691 A1* | 7/2020 | Itagaki | H04W 74/08 |
| 2020/0322279 A1* | 10/2020 | Ahn | H04W 74/085 |

OTHER PUBLICATIONS

Ghosh, et al., "Random Access with Trigger Frames using OFDMA", IEEE 802.11-15/0875r1, Jul. 2015, 16 pages.

Draft Standard for Information technology; Telecommunications and information exchange between systems; Local and metropolitan area networks; Specific requirements; Part 11: Wireless LAN Medium Access Control (MAC) and Physical Layer (PHY) Specifications, IEEE P802.11-REVmcTM/D2.0, Oct. 2013. 108 pages.

* cited by examiner (A)

(B)

METHOD FOR TRANSMITTING FRAME IN WIRELESS LAN SYSTEM, AND WIRELESS TERMINAL USING SAME

CROSS-REFERENCE TO RELATED APPLICATIONS

This application is the National Stage filing under 35 U.S.C. 371 of International Application No. PCT/KR2017/005105, filed on May 17, 2017, which claims the benefit of U.S. Provisional Application No. 62/341,086, filed on May 25, 2016, the contents of which are all hereby incorporated by reference herein in their entirety.

BACKGROUND OF THE INVENTION

Field of the Invention

The present specification relates to wireless communication and, more particularly, to a method for transmitting a frame in a wireless local area network system and a wireless terminal using the same.

Related Art

A next-generation WLAN is aimed at 1) improving Institute of Electrical and Electronics Engineers (IEEE) 802.11 physical (PHY) and medium access control (MAC) layers in bands of 2.4 GHz and 5 GHz, 2) increasing spectrum efficiency and area throughput, and 3) improving performance in actual indoor and outdoor environments, such as an environment in which an interference source exists, a dense heterogeneous network environment, and an environment in which a high user load exists.

In the next-generation WLAN, a dense environment having a great number of access points (APs) and stations (STAs) is primarily considered. Discussions have been conducted on improvement in spectrum efficiency and area throughput in this dense environment. The next-generation WLAN pays attention to actual performance improvement not only in an indoor environment but also in an outdoor environment, which is not significantly considered in the existing WLAN.

Specifically, scenarios for a wireless office, a smart home, a stadium, a hotspot, and the like receive attention in the next-generation WLAN. Discussions are ongoing on improvement in the performance of a WLAN system in the dense environment including a large number of APs and STAs based on relevant scenarios.

SUMMARY OF THE INVENTION

An aspect of the present specification is to provide a method for transmitting a frame in a wireless local area network (WLAN) system having improved performance and a wireless terminal using the same.

The present specification relates to a method for transmitting a frame in a WLAN system. A method for transmitting a frame in a WLAN system according to one embodiment includes: transmitting, by a wireless terminal, a trigger frame including identification information for a plurality of user stations (STAs) and resource information indicating a resource unit (RU) separately allocated for the plurality of user STAs, wherein: when the trigger frame is a basic trigger frame, the resource information is set based on first to seventh index ranges corresponding to RUs with first to seventh sizes in order to indicate a plurality of RUs for uplink transmission, and when the trigger frame is the MU RTS frame, the resource information is set based on first to fourth index values in the fourth index range in order to indicate a primary 20 MHz channel for transmitting a Clear to Send (CTS) frame, which is a response to a multi-user Request to Send (MU RTS) frame, is set based on fifth and sixth index values in the fifth index range in order to indicate a primary 40 MHz channel for transmitting the CTS frame, and is set based on a seventh index value in the sixth index range in order to indicate a primary 80 MHz channel for transmitting the CTS frame.

According to one embodiment of the present specification, there are provided a method for transmitting a frame in a WLAN system having improved performance and a wireless terminal using the same.

DESCRIPTION OF EXEMPLARY EMBODIMENTS

The aforementioned features and following detailed descriptions are provided for exemplary purposes to facilitate explanation and understanding of the present specification. That is, the present specification is not limited to such an embodiment and thus may be embodied in other forms.

The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also include complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

Figure 1:
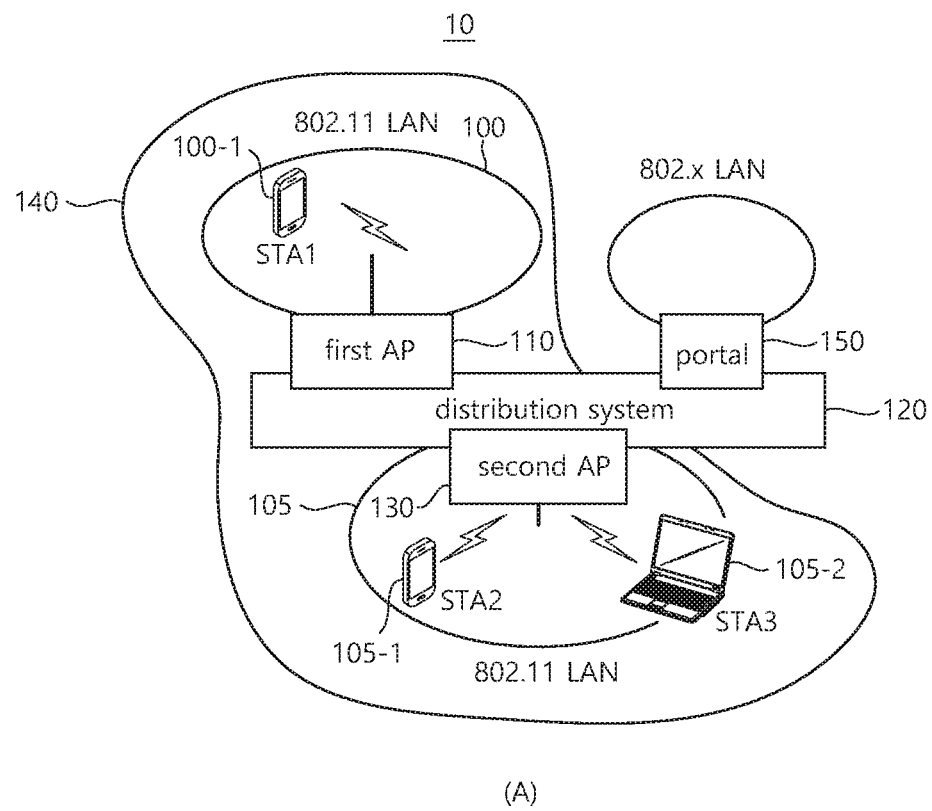
FIG. 1 is a conceptual view illustrating the structure of a wireless local area network (WLAN).
Figure 1:
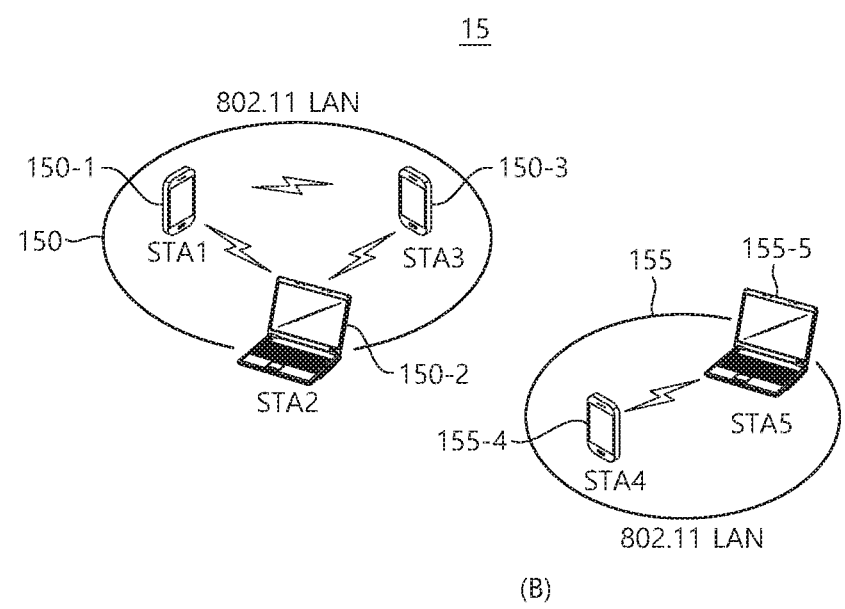

FIG. 1 is a conceptual view illustrating the structure of a wireless local area network (WLAN). FIG. 1(A) illustrates the structure of an infrastructure basic service set (BSS) of institute of electrical and electronic engineers (IEEE) 802.11.

Referring the FIG. 1(A), the WLAN system 10 of the FIG. 1(A) may include one or more infrastructure BSSs 100 and 105 (hereinafter, referred to as BSS). The BSSs 100 and 105 as a set of an access point (hereinafter, referred to as AP) and a station (hereinafter, referred to STA) such as an AP 110 and a STA 100-1 which are successfully synchronized to communicate with each other are not concepts indicating a specific region.

For example, the BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 110, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the WLAN network (IEEE 802.11) and another network (e.g., 802.X).

In the BSS illustrated in the FIG. 1(A), a network between the APs 110 and 130 and a network between the APs 110 and 130 and the STAs 100-1, 105-1, and 105-2 may be implemented.

FIG. 1(B) illustrates a conceptual view illustrating the IBSS. Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1(B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner.

In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Figure 2:
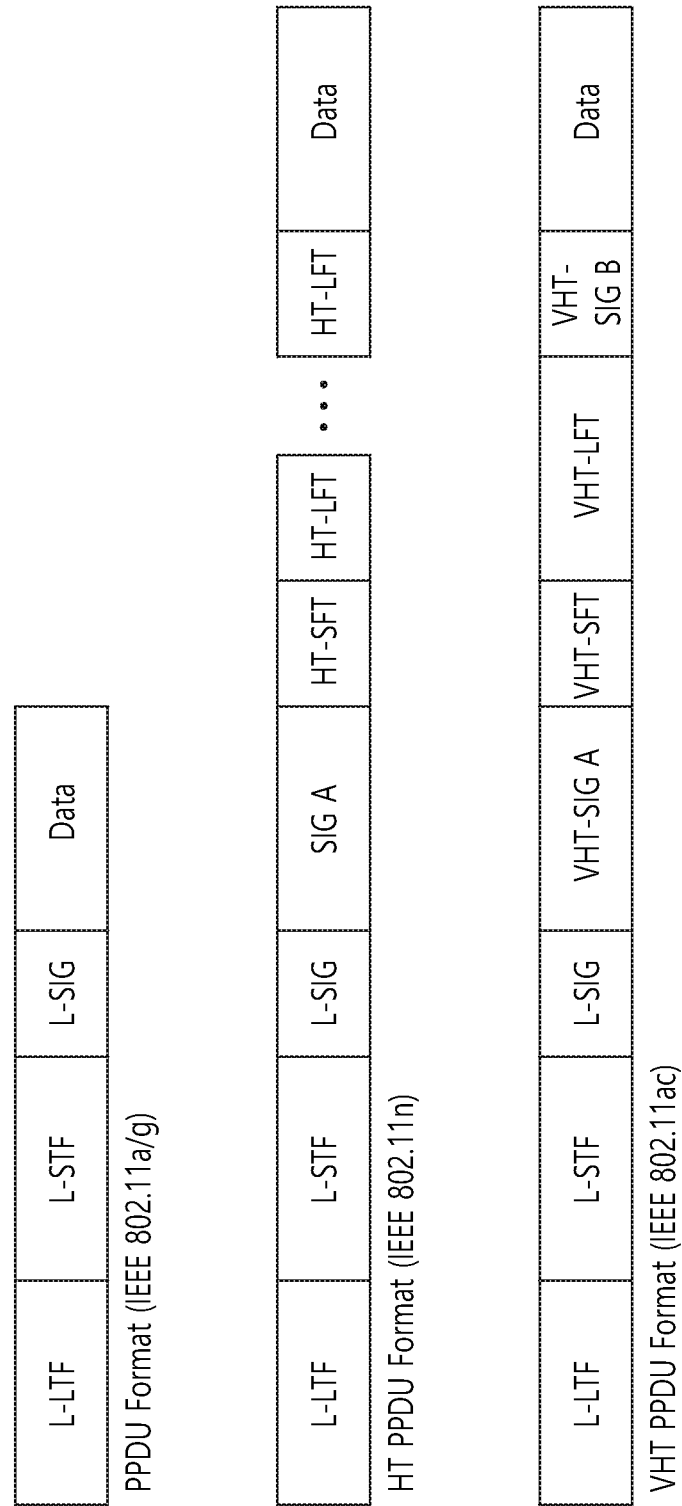
FIG. 2 is a diagram illustrating an example of a PPDU used in an IEEE standard.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
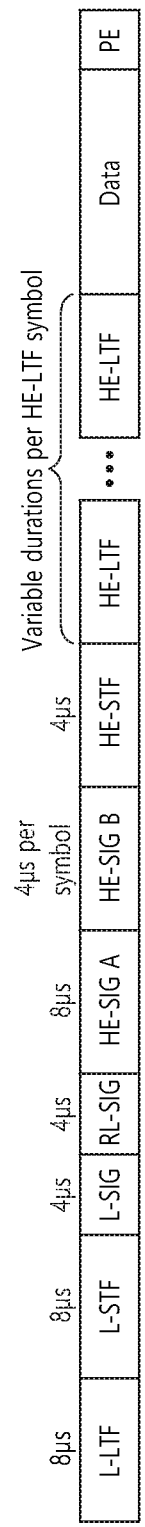
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs). More detailed description of the respective fields of FIG. 3 will be made below.

Figure 4:
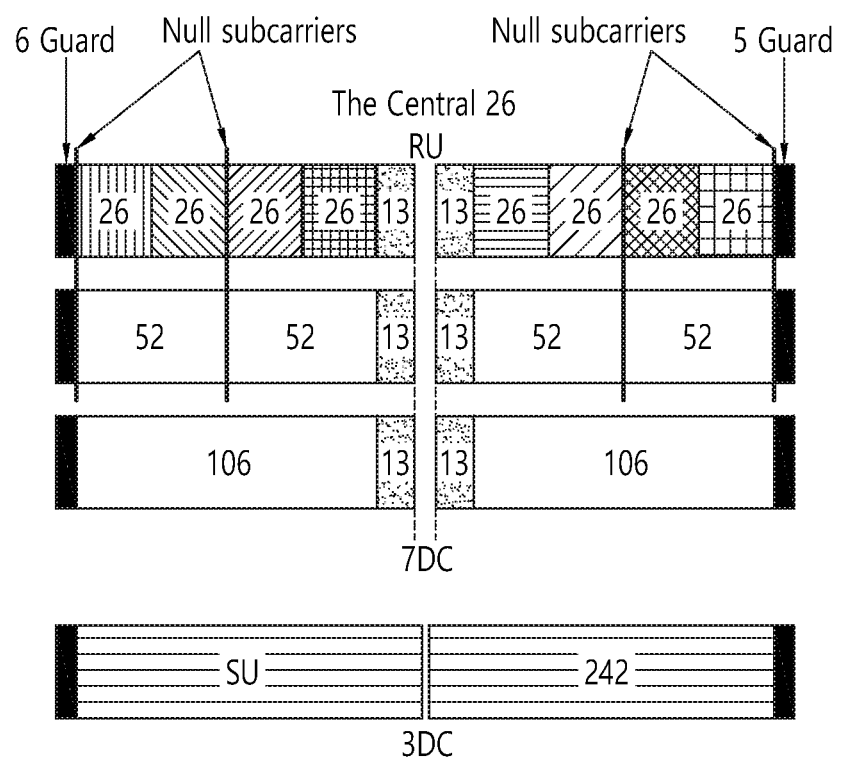
FIG. 4 is a diagram illustrating a layout of resource units used in a band of 20 MHz.

FIG. 4 is a diagram illustrating a layout of resource units (RUs) used in a band of 20 MHz. As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, a 26-unit (that is, a unit corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
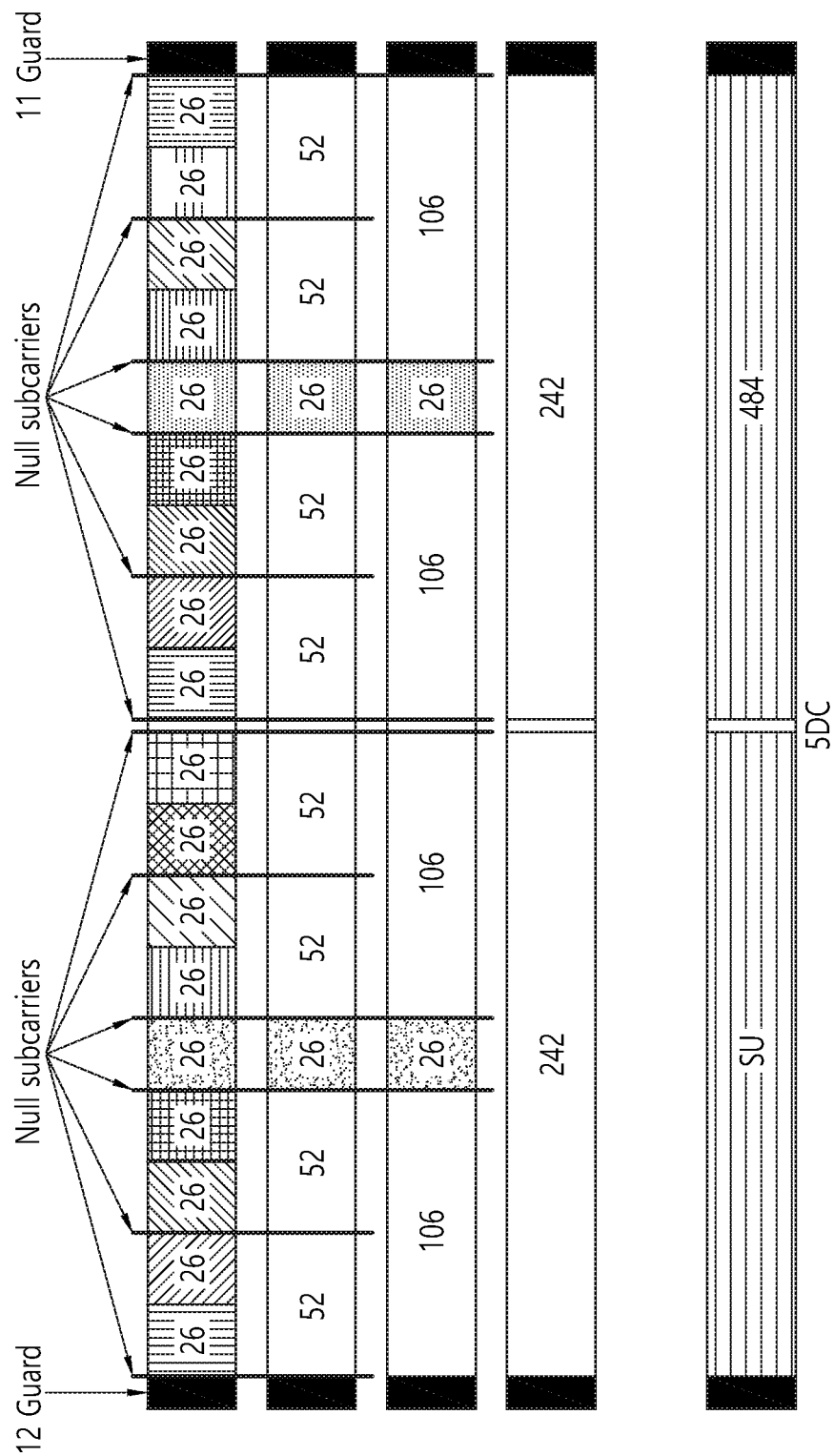
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
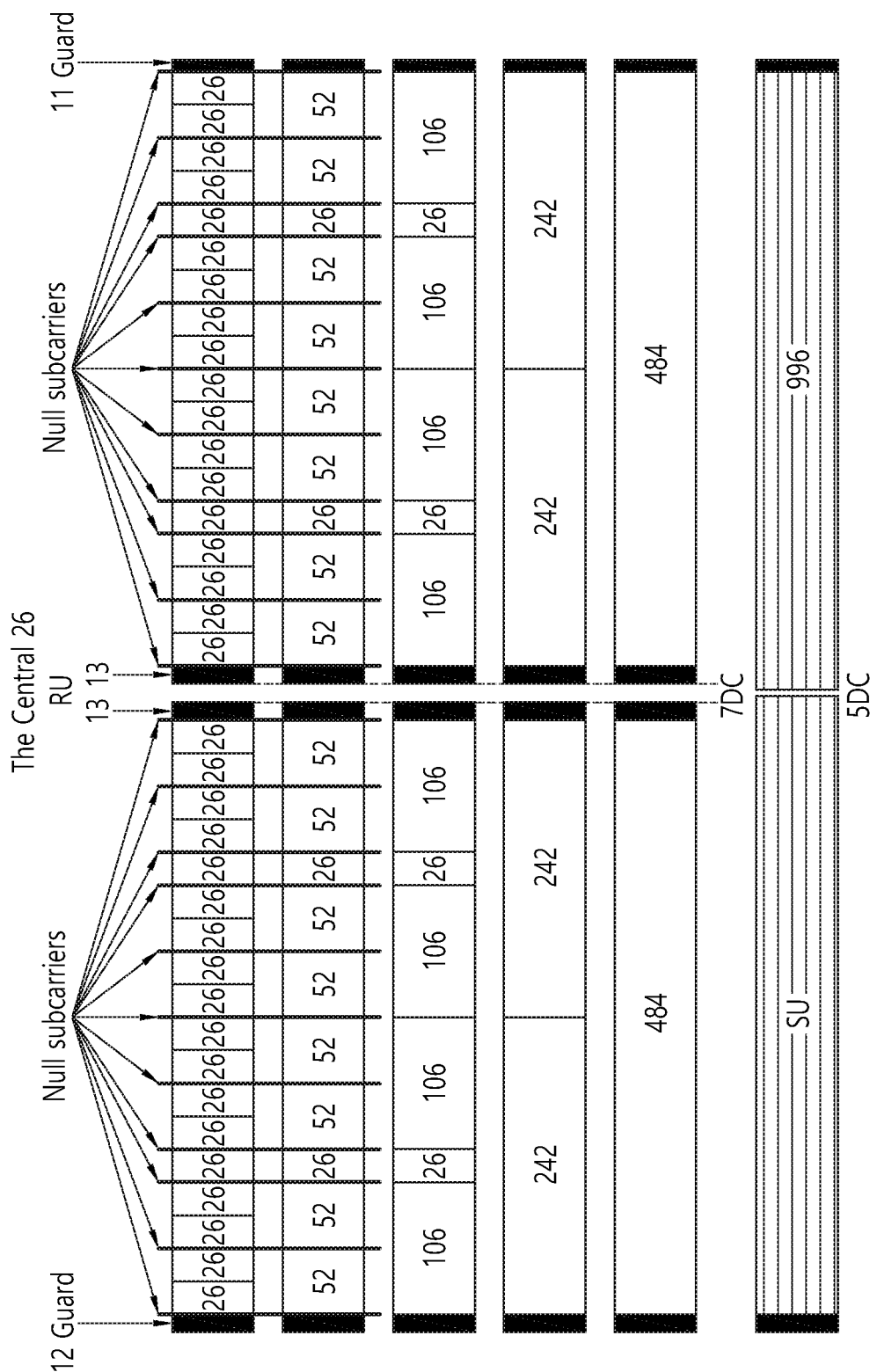
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
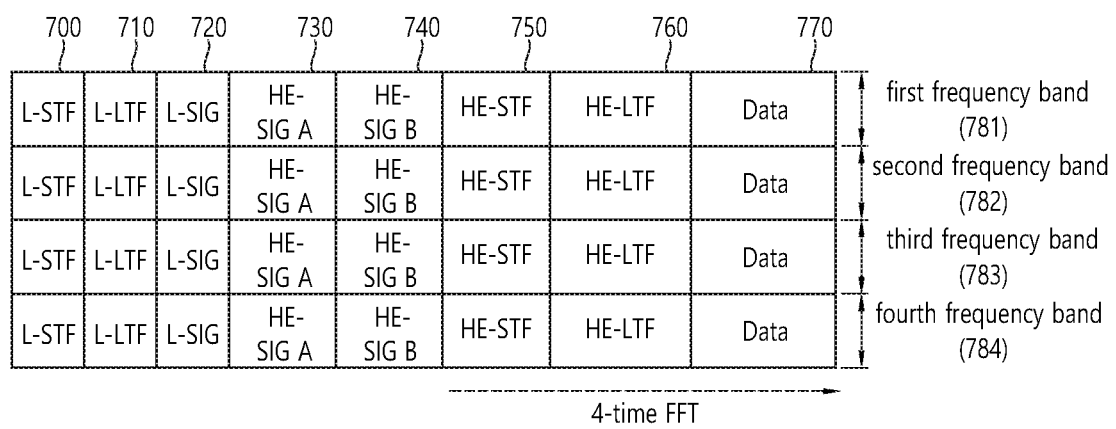
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (e.g., may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA. The HE-SIG-B 740 will be described below in a greater detail with reference to FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy WLAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy WLAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a term called downlink data (alternatively, a downlink frame), and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the WLAN system to which the embodiment of the present description is applied, the whole bandwidth may be used for downlink transmission to one STA and uplink transmission to one STA. Further, in the WLAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the WLAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the WLAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the WLAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy WLAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy WLAN system, the primary channel rule used for allocating the multiple channels may be a large limit in obtaining a high throughput by operating the wider bandwidth in a current WLAN environment in which the OBSS is not small.

In order to solve the problem, in the embodiment, a WLAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
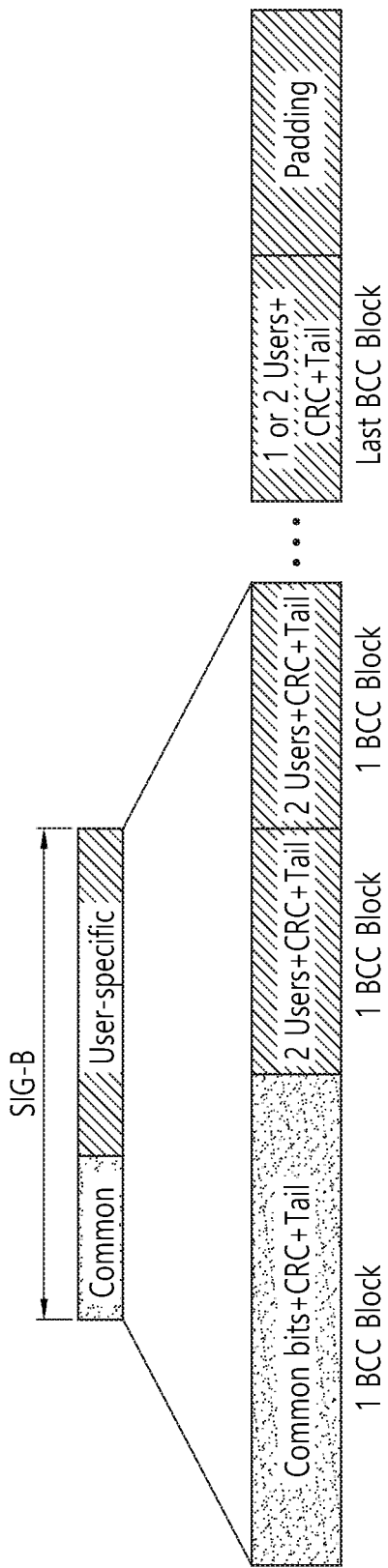
FIG. 8 is a block diagram illustrating one example of HE-SIG-B.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
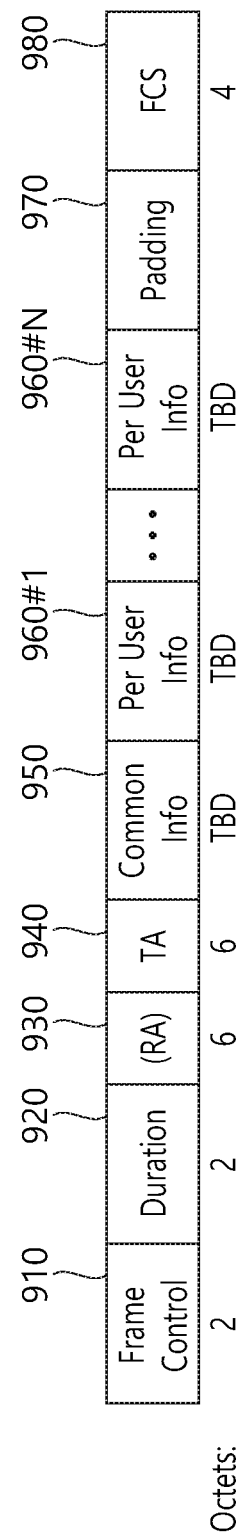
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
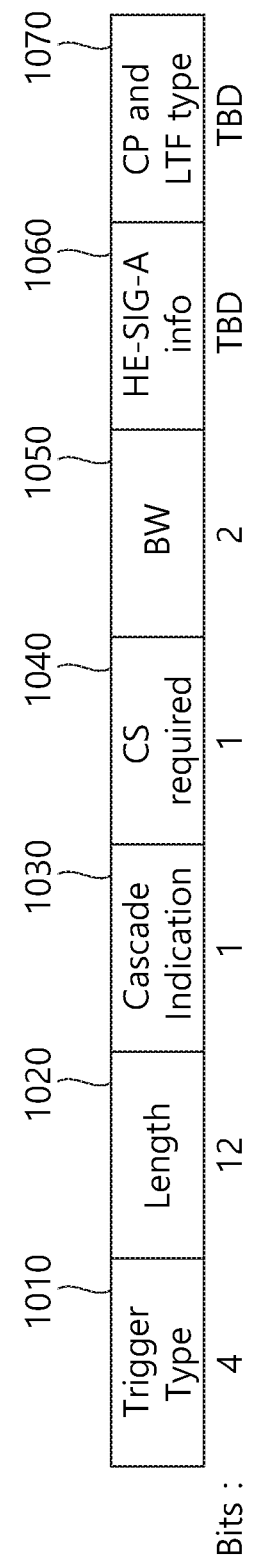
FIG. 10 illustrates an example of sub-fields included in a common information field.

FIG. 10 illustrates an example of sub-fields included in a common information field. Some parts of the sub-field of FIG. 10 may be omitted, and extra sub-fields may be added. Further, a length of each of the sub-fields shown herein may change.

A Trigger Type field 1010 may indicate the use of a trigger frame, for example, general triggering, triggering for beamforming, and a request for a block ACK/NACK.

The Trigger Type field 1010 will be described in more detail with reference to the following drawing.

As shown in the drawing, the Length field 1020 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1020 of the trigger frame may be used for indicating the length of its respective uplink PPDU.

Additionally, a Cascade Indicator field 1030 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1040 indicates whether or not the status or NAV of a wireless medium is required to be considered in a situation where a receiving device that has received the corresponding trigger frame transmits the respective uplink PPDU.

A BW field 1050 may indicate a bandwidth for a trigger-based PPDU transmitted in response to the trigger frame.

A HE-SIG-A information field 1060 may include information controlling the content of a SIG-A field (i.e., HE-SIG-A field) of an uplink PPDU, which is being transmitted in response to the corresponding trigger frame.

A CP and LTF type field 1070 may include information on a LTF length and a CP length of the uplink PPDU being transmitted in response to the corresponding trigger frame.

Figure 11:
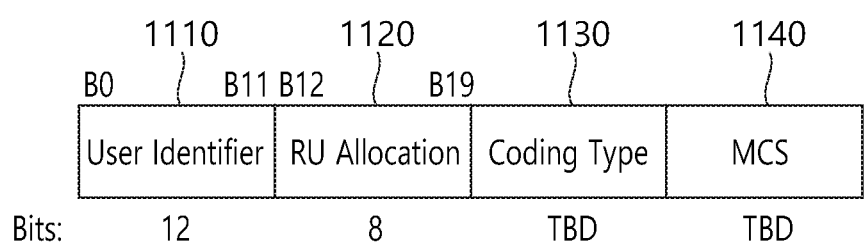
FIG. 11 illustrates an example of sub-fields included in a per user information.

FIG. 11 illustrates an example of sub-fields included in a per user information field. Among the sub-fields of FIG. 11, some (or part) of the sub-fields may be omitted, and other additional sub-fields may also be added. Additionally, the length of each of the sub-fields shown in the drawing may be varied.

A User Identifier field (1110) of FIG. 11 indicates an identifier of an STA (i.e., receiving STA) to which the per user information corresponds, and an example of the identifier may correspond to all or part of the AID.

Additionally, a RU Allocation field (1120) may be included in the sub-field of the per user information field. More specifically, in case a receiving STA, which is identified by the User Identifier field (1110), transmits an uplink PPDU in response to the trigger frame of FIG. 9, the corresponding uplink PPDU is transmitted through the RU, which is indicated by the RU Allocation field (1120). In this case, it is preferable that the RU that is being indicated by the RU Allocation field (1120) corresponds to the RU shown in FIG. 4, FIG. 5, and FIG. 6.

The RU Allocation field 1120 will be described in more detail with reference to the following drawing.

The sub-field of FIG. 11 may include a Coding Type field (1130). The Coding Type field (1130) may indicate a coding type of the uplink PPDU being transmitted in response to the trigger frame of FIG. 9. For example, in case BBC coding is applied to the uplink PPDU, the Coding Type field (1130) may be set to '1', and, in case LDPC coding is applied to the uplink PPDU, the Coding Type field (1130) may be set to '0'.

Additionally, the sub-field of FIG. 11 may include an MCS field (1140). The MCS field (1140) may indicate an MCS scheme being applied to the uplink PPDU that is transmitted in response to the trigger frame of FIG. 9.

Figure 12:
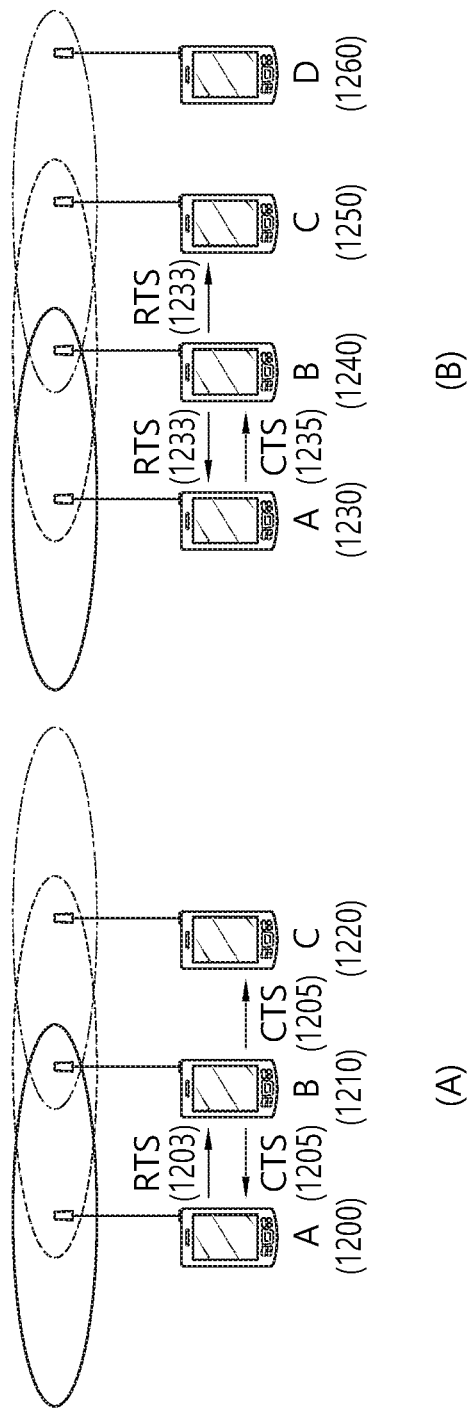
FIG. 12 is a conceptual view illustrating a method of using an RTS frame and a CTS frame to solve a hidden node issue and an exposed node issue.

FIG. 12 is a conceptual view illustrating a method of using an RTS frame and a CTS frame to solve a hidden node issue and an exposed node issue.

Referring to FIG. 12, a short signaling frame, such as a Request to Send (RTS) frame and a Clear to Send (CTS) frame, may be used in order to solve a hidden node issue and an exposed node issue. Neighboring STAs can know whether data is transmitted or received between two STAs based on an RTS frame and a CTS frame.

In FIG. 12, (A) illustrates a method of transmitting an RTS frame 1203 and a CTS frame 1205 to solve a hidden node issue.

It is assumed that both STA A 1200 and STA C 1220 attempt to transmit a data frame to STA B 1210. For example, STA A 1200 may transmit the RTS frame 1203 to STA B 1210 before transmitting a data frame, while STA B 1210 may transmit the CTS frame 1205 to STA A 1200.

STA C 1220 may overhear the CTS frame 1205 and may recognize the transmission of the frame from STA A 1200 to STA B 1210 via a medium. STA C 1220 may set a network allocation vector (NAV) until the transmission of the data frame from STA A 1200 to STA B 1210 is completed. Using this method may prevent a collision between frames due to a hidden node.

In FIG. 12, (B) illustrates a method of transmitting an RTS frame 1233 and a CTS frame 1235 to resolve an exposed node issue.

For example, STA C 1250 may determine whether a collision occurs when transmitting a frame to another STA D 1260 based on monitoring of an RTS frame 1233 and a CTS frame 1235 between STA A 1230 and STA B 1240.

STA B 1240 may transmit the RTS frame 1233 to STA A 1230, and STA A 1230 may transmit the CTS frame 1235 to STA B 1240. STA C 1250 can overhear only the RTS frame 1233 transmitted by STA B 1240. However, STA C 1250 cannot overhear the CTS frame 1235 transmitted by the STA A 1230.

Therefore, STA C 1250 may determine that STA A 1230 is located outside the carrier sensing range of STA C 1250. Accordingly, STA C 1250 can transmit data to STA D 1260.

An RTS frame format and a CTS frame format are disclosed in 8.3.1.2 RTS frame format and 8.3.1.3 CTS frame format, IEEE P802.11-REVmc™/D2.0, October 2013.

Figure 13:
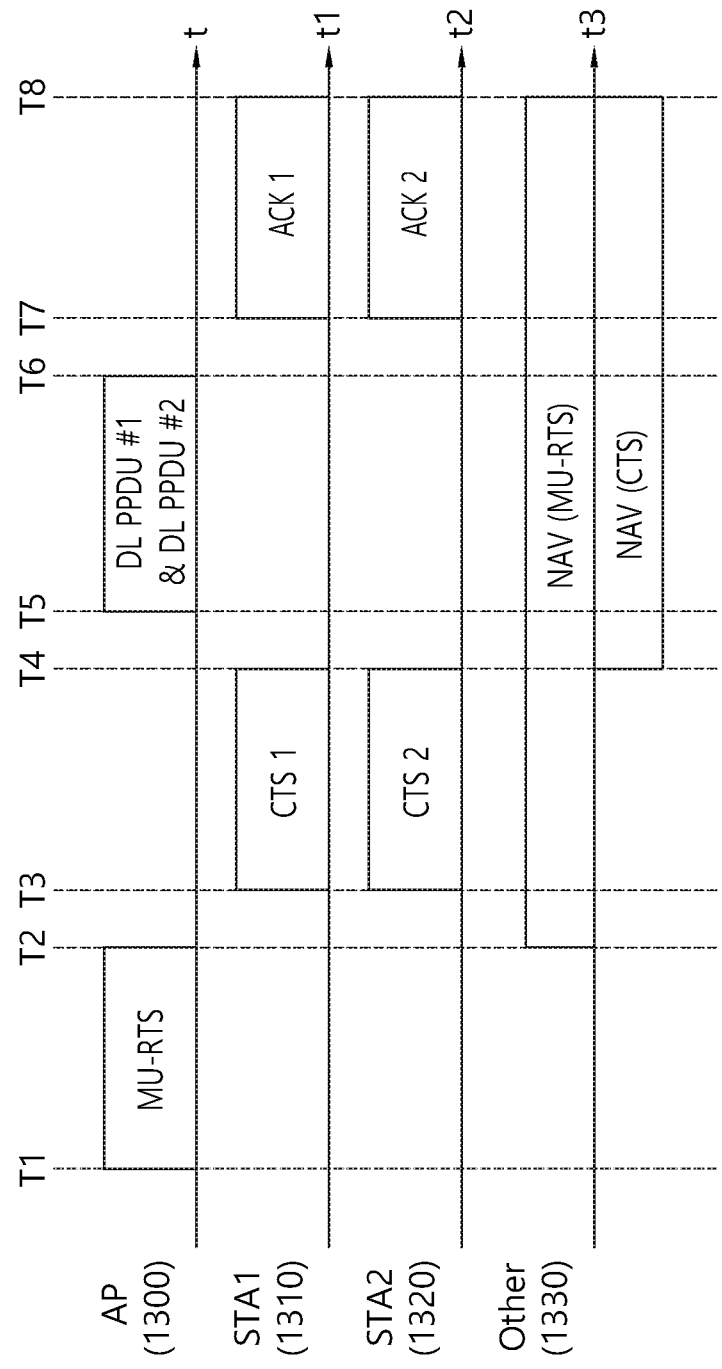
FIG. 13 illustrates the downlink operation of multiple users in accordance with a procedure of an RTS frame and a plurality of CTS frames for the multiple users according to one embodiment

FIG. 13 illustrates the downlink operation of multiple users in accordance with a procedure of an RTS frame and a plurality of CTS frames for the multiple users according to one embodiment.

Referring to FIGS. 1 to 13, the horizontal axis for AP 1300 represents time t, and the vertical axis is associated with the presence of a frame transmitted by AP 1300.

The horizontal axis for a first STA 1310 represents time t1, and the vertical axis is associated with the presence of a frame transmitted by the first STA 1310. The horizontal axis for a second STA 1320 represents time t2, and the vertical axis is associated with the presence of a frame transmitted by the second STA 1320.

The horizontal axis for a neighboring STA 1330 represents time 3, and the vertical axis represents the operation of an NAV timer of the neighboring STA 1330.

In a first period (T1 to T2) of FIG. 13, the AP 1300 may transmit a multi-user RTS trigger (hereinafter, 'MU RTS') frame. The MU RTS frame according to the present embodiment may be construed as a variant of the trigger frame mentioned above in FIGS. 9 to 11.

Specifically, an address for broadcast may be set in an RA field (930 in FIG. 9) of the MU RTS frame. An address for an STA that transmits the MU-RTS frame may be set in a TA field (940 in FIG. 9) of the MU RTS frame.

To indicate the MU RTS frame, the Trigger Type field 1010 of FIG. 10 may be set to 3. The bandwidth of a channel for the transmission of a trigger-based PPDU, which is a response to the MU RTS frame, may be indicated through the BW field 1050.

For example, 0 may be set in the BW field 1050 to indicate that the bandwidth for the trigger-based PPDU is 20 MHz. Further, 1 may be set in the BW field 1050 to indicate that the bandwidth for the trigger-based PPDU is 40 MHz.

For example, 2 may be set in the BW field 1050 to indicate that the bandwidth for the trigger-based PPDU is 80 MHz. Further, 3 may be set in the BW field 1050 to indicate that the bandwidth for the trigger-based PPDU is 80+80 MHz or 160 MHz.

For the MU RTS frame, other fields (e.g., the Length field 1020, the HE-SIG-A information field 1060, the Coding Type field 1130, and the MCS field 1140) included in the trigger frame may be set as reserved fields.

Referring to FIG. 13, the MU RTS frame may include first and second per user information fields (e.g., 960#1 and 960#2 in FIG. 9). Each of the per user information fields 960#1 and 960#2 may include a User Identifier field 1110 and an RU Allocation field 1120 as illustrated in FIG. 11.

For example, a first User Identifier field (i.e., 1110 of 960#1) for the first STA 1310 may include some of the bits of an association identifier (AID) for the first STA 1310. A second User Identifier field (i.e., 1110 of 960#2) for the second STA 1320 may include some of the bits of an AID for the second STA 1320.

For example, a first RU Allocation field (i.e., 1120 of 960#1) for the first STA 1310 and a second RU Allocation field (i.e., 1120 of 960#2) for the second STA 1320 may indicate whether a CTS frame is through a primary 20 MHz channel, a primary 40 MHz channel, a primary 80 MHz channel, a primary 80+80 MHz channel, or a primary 160 MHz channel.

The primary 20 MHz channel may be a channel preset by the AP. Information on the primary 20 MHz channel may be included in a beacon frame and may be signaled to each user STA. Details of the RU Allocation fields and the primary channels according to the present embodiment will be described with reference to the following drawing.

In the first period (T1 to T2) of FIG. 13, the neighboring STA 1330, which is not an STA receiving the MU RTS frame, may set an NAV by referring to a Duration field (e.g., 920 in FIG. 9) of the MU RTS frame.

A second period (T2 to T3) of FIG. 13 may be construed as a short inter-frame space (SIFS). In the present embodiment, the SIFS may be the timing used to separate a response frame from a frame for soliciting a response. For example, the duration of the SFS (aSIFSTime) may be 16 μs.

In a third period (T3 to T4) of FIG. 13, a user STA receiving the MU RTS frame may transmit a CTS response frame to the AP through a channel indicated by the RU Allocation field. In the third period (T3 to T4), the neighboring STA 1330, which is not the STA receiving the CTS response frame, may set an NAV by referring to a Duration field (not shown) of the CTS response frame.

The CTS response frame according to the present embodiment may be construed as a legacy PPDU (non-HT PPDU or non-HT duplicate PPDU) including a CTS frame that is an MAC frame.

For example, the first STA 1310 may transmit a first CTS response frame (CTS1) to the AP 1300 through a channel indicated by the RU Allocation field (i.e., 1120 of 960#1) in response to the MU RTS frame.

That is, the first CTS response frame (CTS1) may be a PPDU transmitted via the primary 20 MHz channel, the primary 40 MHz channel, the primary 80 MHz channel, the 160 MHz channel, or the 80+80 MHz channel.

For example, the second STA 1320 may transmit a second CTS response frame (CTS2) to the AP 1300 through a channel indicated by the RU Allocation field (i.e., 1120 of 960#2) in response to the MU RTS frame.

That is, the second CTS response frame (CTS2) may be a PPDU transmitted via the primary 20 MHz channel, the primary 40 MHz channel, the primary 80 MHz channel, the 160 MHz channel, or the 80+80 MHz channel.

In the wireless LAN system according to the present embodiment, the AP 1300 and the STAs 1310, 1320, and 1330 associated with the AP 1300 may wait in a fourth period (T4 to T5) of FIG. 13.

In a fifth period (T5 to T6) of FIG. 13, the AP 1300 may transmit downlink frames (i.e., DL PPDU #1 and DL PPDU #2) for the first STA 1310 and the second STA 1320.

In the wireless LAN system according to the present embodiment, the AP 1300 and the STAs 1310, 1320, and 1330 associated with the AP 1300 may wait in a sixth period (T6 to T7) of FIG. 13.

In a seventh period (T7 to T8) of FIG. 13, each of the STAs 1310 and 1320 may separately transmit an ACK frame (ACK1 and ACK2) to the AP 1300 to report the successful reception of the downlink frames (i.e., DL MU PPDUs).

Figure 14:
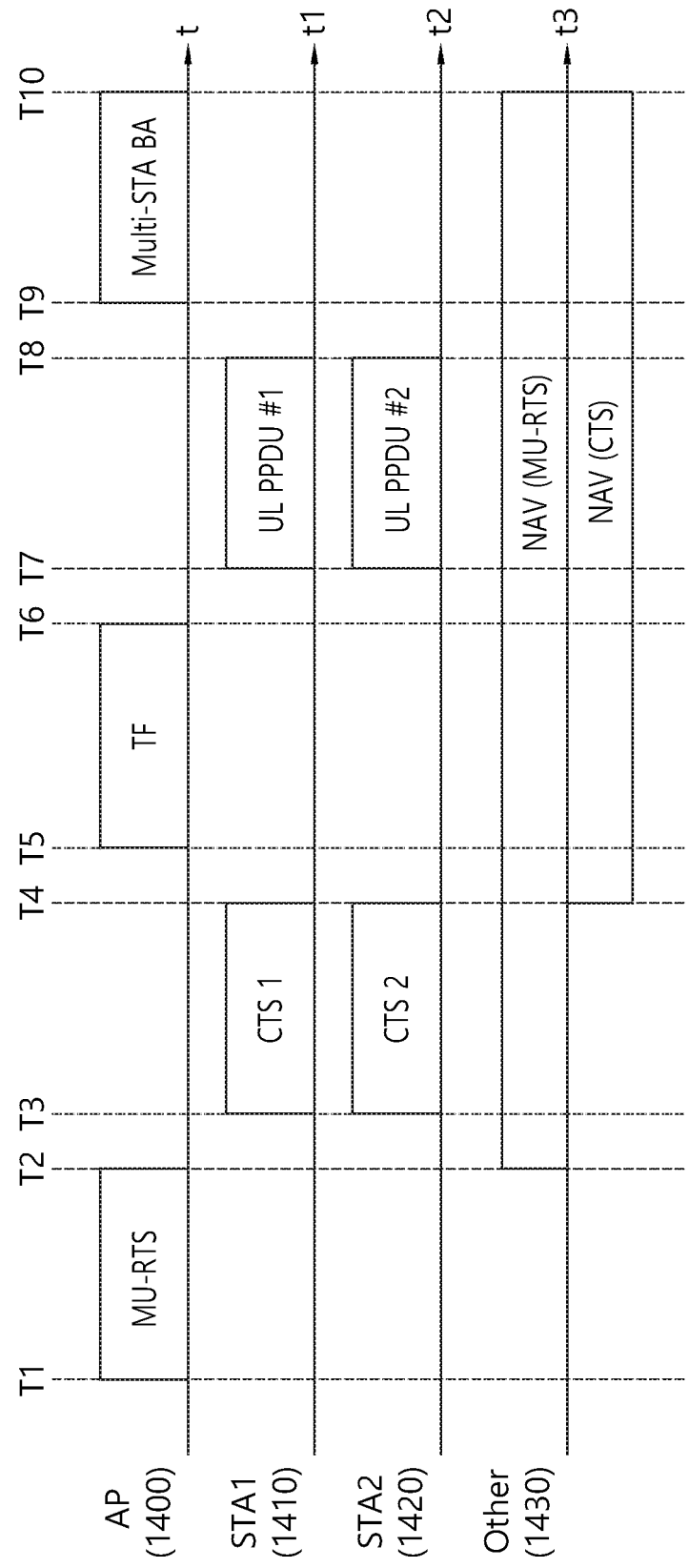
FIG. 14 illustrates the uplink operation of multiple users in accordance with a procedure of an RTS frame and a plurality of CTS frames for the multiple users according to one embodiment.

FIG. 14 illustrates the uplink operation of multiple users in accordance with a procedure of an RTS frame and a plurality of CTS frames for the multiple users according to one embodiment.

Referring to FIGS. 13 and 14, an AP 1400, a first STA 1410, a second STA 1420, and a neighboring STA 1430 of FIG. 14 may be understood to correspond to the AP 1300, the first STA 1310, the second STA 1320, and the neighboring STA 1330.

Further, a first period (T1 to T2) to a fourth period (T4 to T5) in FIG. 14 may be understood to correspond to the first period (T1 to T2) to the fourth period (T4 to T5) in FIG. 13.

In a fifth period (T5 to T6) of FIG. 14, the AP 1400 may transmit a basic trigger frame (TF) to the plurality of STAs 1410, 1420, and 1430. The basic trigger frame (TF) in the fifth period (T5 to T6) may be understood based on FIGS. 9 to 11 described above.

The basic trigger frame transmitted by the AP 1400 in the fifth period (T5 to T6) of FIG. 14 may include first and second per user information fields (e.g., 960#1 and 960#2 in FIG. 9). Each of the per user information fields 960#1 and 960#2 may include a User Identifier field 1110 and an RU Allocation field 1120 as illustrated in FIG. 11.

For example, a first User Identifier field (i.e., 1110 of 960#1) for the first STA 1410 may include some of the bits of an AID for the first STA 1410. A second User Identifier field (i.e., 1110 of 960#2) for the second STA 1420 may include some of the bits of an AID for the second STA 1420.

For example, a first RU Allocation field (i.e., 1120 of 960#1) for the first STA 1410 and a second RU Allocation field (i.e., 1120 of 960#2) for the second STA 1420 may be set to indicate the RU illustrated in FIG. 4, 5, or 6.

A sixth period (T6 to T7) of FIG. 14 may be construed as an SIFS.

In a seventh period (T7 to T8) of FIG. 14, each of the STAs 1410 and 1420 indicated by the basic trigger frame transmits an uplink frame (i.e., uplink PPDU, such as UL PPDU #1 and UL PPDU #2) based on an RU individually indicated by the basic trigger frame.

An eighth period (T8 to T9) of FIG. 14 may be construed as an SIFS.

In a ninth period (T9 to T10) of FIG. 14, the AP 1400 may transmit a block ACK frame (multi-STA BA) in order to report, to the multiple users 1410 and 1420, the successful reception of the uplink frame (UL PPDU #1 and UL PPDU #2) individually received from each of the STAs 1410 and 1420.

Figure 15:
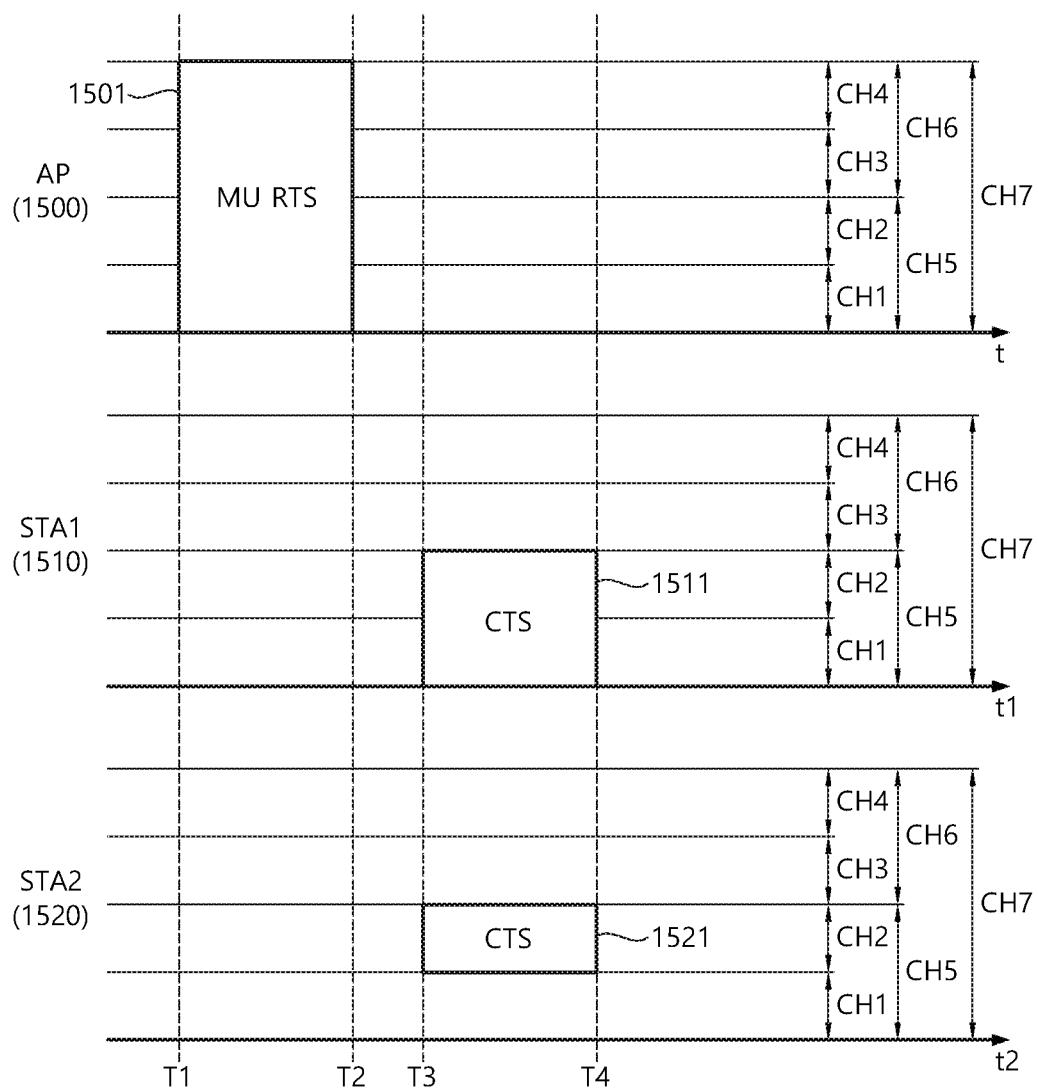
FIG. 15 specifically illustrates a procedure of an RTS frame and a plurality of CTS frames for multiple users according to one embodiment.

FIG. 15 specifically illustrates a procedure of an RTS frame and a plurality of CTS frames for multiple users according to one embodiment.

Referring to FIGS. 1 to 15, an AP 1500 may be understood based on the AP 1300 described above in FIG. 13. Similarly, a first STA 1510 and a second STA 1520 may be understood based on the first STA 1310 and the second STA 1320 described above in FIG. 13.

For a clear and concise description of FIG. 15, it is assumed that first to fourth channels (CH1 to CH4) have a bandwidth of 20 MHz. In this embodiment, one of the first to fourth channels (CH1 to CH4) may be preset as a primary 20 MHz channel. The channels other than the primary 20 MHz channel may be construed as non-primary 20 MHz channels.

It is assumed that fifth and sixth channels (CH5 and CH6) have a bandwidth of 40 MHz. In this embodiment, a channel including the primary 20 MHz channel among the fifth and sixth channels (CH5 and CH6) may be construed as a primary 40 MHz channel. The channel other than the primary 40 MHz channel may be a secondary 40 MHz channel. A seventh channel (CH7) is a channel having a bandwidth of 80 MHz. The seventh channel (CH7) may be construed as a primary 80 MHz channel including the primary 20 MHz channel.

Hereinafter, a specific embodiment of the RU Allocation field 1120 of FIG. 11 for a basic trigger frame is described The RU Allocation field 1120 for the basic trigger frame (TF) may indicate an RU used for the transmission of a trigger-based PPDU by an STA identified by the User Identifier field 1110.

A particular bit (B12) among the eight bits allocated for the RU Allocation field 1120 for the basic trigger frame (TF) may be used to indicate whether the allocated RU is located in a primary 80 MHz band or a non-primary 80 MHz band.

For example, a first bit (B12) of the RU Allocation field 1120 for the basic trigger frame (TF) may be set to 0 for a 20 MHz PPDU, a 40 MHz PPDU, and an 80 MHz PPDU in the primary 80 MHz band. However, the first bit B12 of the RU Allocation field 1120 for the basic trigger frame (TF) may be set to 1 for PPDU transmission in the non-primary 80 MHz band.

Seven bits (B19-B13) of the RU Allocation field 1120 for the basic trigger frame (TF) may be illustrated below in Table 1.

TABLE 1

| B19-B13 | Description | Number of entries |
|---|---|---|
| 0000000-0100100 | Possible 26-tone RU cases in 80 MHz | 37 |
| 0100101-0110100 | Possible 52-tone RU cases in 80 MHz | 16 |
| 0220202-0111100 | Possible 106-tone RU cases in 80 MHz | 8 |
| 0111101-1000000 | Possible 242-tone RU cases in 80 MHz | 4 |
| 1000001-1000010 | Possible 484-tone RU cases in 80 MHz | 2 |
| 1000011 | 996-tone RU cases in 80 MHz | 1 |
| 1000100 | 2 × 996-tone RU case | 1 |
| Total | — | 69 |

The seven bits (B19-B13) of the RU Allocation field 1120 for the basic trigger from (TF) may be related to the BW field 1050 included in the common information field 950 of the aforementioned trigger frame.

Referring to FIG. 4 and Table 1, an example of a 20 MHz PPDU transmitted in response to the basic trigger frame (TF) is described.

Referring to Table 1, nine 26-units (i.e., units each corresponding to 26 tones) illustrated in FIG. 4 may be indicated based on a first index range (0000000-0100100).

For example, a first index value (0000000) in the first index range (0000000-0100100) may correspond to a first RU (RU1) located next to the leftmost guard band including six tones. The first RU (RU1) may be construed, for example, as a subcarrier set of [−121: −96].

Second to eighth index values (0000001-0000111) in the first index range (0000000-0100100) may correspond to second to eighth RUs (RU2 to RU8) sequentially arranged in a left-to-right direction.

Similarly, a ninth index value (0001000) in the first index range (0000000-0100100) may correspond to a ninth RU (RU9) located next to the rightmost guard band including five tones. The ninth RU (RU9) may be construed, for example, as a subcarrier set of [96: 121].

In this case, the first to ninth RUs (RU1 to RU9) may be referred to as RUs with a first size. The remaining index values (0101001-0110100) in the first index range (0000000-0100100) may not be used.

Referring to Table 1, four 52-units (i.e., units each corresponding to 52 tones) illustrated in FIG. 4 may be indicated based on a second index range (0100101-0110100).

For example, a first index value (0100101) in the second index range (0100101-0110100) may correspond to a tenth RU (RU10) located next to the leftmost guard band including six tones. The tenth RU (RU10) may be construed, for example, as a subcarrier set of [−121: 70].

Second and third index values (0100110-0100111) in the second index range (0100101-0110100) may correspond to 1th and 12th RUs (RU11 and RU12) sequentially arranged in the left-to-right direction.

Likewise, a fourth index value (0101000) in the second index range (0100101-0110100) may correspond to a 13th RU (RU13) located next to the rightmost guard band including five tones. The 13th RU (RU13) may be construed, for example, as a subcarrier set of [70: 121].

In this case, the tenth to 13th RUs (RU10 to RU13) may be referred to as RUs with a second size. The remaining index values (0101001-0110100) in the second index range (0100101-0110100) may not be used.

Referring to Table 1, two 106-units (i.e., units each corresponding to 106 tones) illustrated in FIG. 4 may be indicated based on a third index range (0110101-0111100).

For example, a first index value (0110101) in the third index range (0110101-0111100) may correspond to a 14th RU (RU14) located next to the leftmost guard band including six tones. The 14th RU (RU14) may be construed, for example, as a subcarrier set of [−122: −17].

Likewise, a second index value (0110110) in third index range (0110101-0111100) may correspond to a 15th RU (RU15) located next to the rightmost guard band including five tones. The 15th RU (RU15) may be construed, for example, as a subcarrier set of [17: 122].

In this case, the 14th and 15th RUs (RU14 and RU15) may be referred to as RUs with a third size. The remaining index values (0110111-0111100) in the third index range (0110101-0111100) may not be used.

Referring to Table 1, one 242-unit (i.e., a unit corresponding to 242 tones) illustrated in FIG. 4 may be indicated based on a fourth index range (0111101-1000000).

For example, a first index value (0111101) in the fourth index range (0111101-1000000) may correspond to a 16th RU (RU16). The sixteenth RU (RU16) may be construed, for example, as a subcarrier set of [−122: −2, 2: 122].

In this case, the 16th RU (RU16) may be referred to as an RU with a fourth size. The remaining index values (011110-1000000) in the fourth index range (0111101-1000000) may not be used.

Referring to FIG. 5 and Table 1, an example of a 40 MHz PPDU transmitted in response to the basic trigger frame (TF) is described.

Referring to Table 1, 18 26-units (i.e., units each corresponding to 26 tones) illustrated in FIG. 5 may be indicated based on the first index range (0000000-0100100).

For example, the first index value (0000000) in the first index range (0000000-0100100) may correspond to a first RU (RU1) located next to the leftmost guard band including 12 tones. The first RU (RU1) may be construed, for example, as a subcarrier set of [−243: −218].

The second to 17th index values (0000001-0010000) in the first index range (0000000-0100100) may correspond to second to 17th RUs (RU2 to RU17) sequentially arranged in the left-to-right direction.

Likewise, the 18th index value (0010001) in the first index range (0000000-0100100) may correspond to an 18th RU (RU18) located next to the rightmost guard band including 11 tones. The 18th RU (RU18) may be construed, for example, as a subcarrier set of [218: 243].

In this case, the first to 18th RUs (RU1 to RU18) may be referred to as RUs with a first size. The remaining index value (0010010-0100100) in the first index range (0000000-0100100) may not be used.

Referring to Table 1, eight 52-units (i.e., units each corresponding to 52 tones) illustrated in FIG. 5 may be indicated based on the second index range (0100101-0110100).

For example, the first index value (0100101) in the second index range (0100101-0110100) may correspond to a 19th RU (RU19) located next to the leftmost guard band including 12 tones. The 19th RU (RU19) may be construed, for example, as a subcarrier set of [−243: −192].

The second to seventh index values (0100110-0101011) in the second index range (0100101-0110100) may correspond to 20th to 25th RUs (RU20 to RU25) sequentially arranged in the left-to-right direction.

Likewise, the eighth index value (0101100) in the second index range (0100101-0110100) may correspond to a 26th RU (RU26) located next to the rightmost guard band including 11 tones. The 26th RU (RU26) may be construed, for example, as a subcarrier set of [192: 243].

In this case, the 19th to 26th RUs (RU19 to RU26) may be referred to as RUs with a second size. The remaining index values (0101101-0110100) in the second index range (0100101-0110100) may not be used.

Referring to Table 1, four 106-units (i.e., units each corresponding to 106 tones) illustrated in FIG. 5 may be indicated based on the third index range (0110101-0111100) in Table 1.

For example, the first index value (0110101) in the third index range (0110101-0111100) may correspond to a 27th RU (RU27) located next to the leftmost guard band including 12 tones. The 27th RU (RU27) may be construed, for example, as a subcarrier set of [−243: −138].

The second and third index values (0110110-0110111) in the third index range (0110101-0111100) may correspond to 28th and 29th RUs (RU28 and RU29) sequentially arranged in the left-to-right direction.

Likewise, the fourth index value (0111000) in the third index range (0110101-0111100) may correspond to a 30th RU (RU30) located next to the rightmost guard band including 11 tones. The 30th RU (RU30) may be construed, for example, as a subcarrier set of [138: 243].

In this case, the 27th to 30th RUs (RU27 to RU30) may be referred to as RUs with a third size. The remaining index values (0111001-0111100) in the third index range (0110101-0111100) may not be used.

Referring to Table 1, two 242-units (i.e., units each corresponding to 242 tones) illustrated in FIG. 5 may be indicated based on the fourth index range (0111101-1000000).

For example, the first index value (0111101) in the fourth index range (0111101-1000000) may correspond to a 31st RU (RU31). The 31st RU (RU31) may be construed, for example, as a subcarrier set of [−243: −2].

Likewise, the second index value (0111110) in the fourth index range (0111101-1000000) may correspond to a 32nd RU (RU32). The 32nd RU (RU32) may be construed, for example, as a subcarrier set of [2: 243].

In this case, the 31st and 32nd RUs (RU31 and RU32) may be referred to as RUs with a fourth size. The remaining index values (0111111-1000000) in fourth index range (0111101-1000000) may not be used.

Referring to Table 1, one 484-unit (i.e., a unit corresponding to 484 tones) illustrated in FIG. 5 may be indicated based on a fifth index range (1000001-1000010).

For example, a first index value (1000001) in the fifth index range (1000001-1000010) may correspond to a 33rd RU (RU33). The 33rd RU (RU33) may be construed, for example, as a subcarrier set of [−243: −2: 2: 243].

In this case, the 33rd RU (RU33) may be referred to as an RU with a fifth size. The remaining index value (1000010) in the fifth index range (1000001-1000010) may not be used.

Referring to FIG. 6 and Table 1, an example of an 80 MHz PPDU transmitted in response to the basic trigger frame (TF) is described. Specifically, 37 26-units illustrated in FIG. 6 may be indicated based on the first index range (0000000-0100100) in Table 1.

For example, the first index value (0000000) in the first index range (0000000-0100100) may correspond to a first RU (RU1) located next to the leftmost guard band including 12 tones. The first RU (RU1) may be construed, for example, as a subcarrier set of [−499: −474].

The second to 36th index values (0000001-0100011) in the first index range (0000000-0100100) may correspond to second to 36th RUs (RU2 to RU36) sequentially arranged in the left-to-right direction.

Likewise, the 37th index value (0100100) in the first index range (0000000-0100100) may correspond to a 37th RU (RU 37) located next to the rightmost guard band including 11 tones. The 37th RU (RU37) may be construed, for example, as a subcarrier set of [474: 499].

In this case, the first to 37th RUs (RU1 to RU37) may be referred to as RUs with a first size.

Referring to Table 1, 16 52-units (i.e., units each corresponding to 52 tones) illustrated in FIG. 6 may be indicated based on the second index range (0100101-0110100).

For example, the first index value (0100101) in the second index range (0100101-0110100) may correspond to a 38th RU (RU38) located next to the leftmost guard band including 12 tones. The 38th RU (RU38) may be construed, for example, as a subcarrier set of [−499: −448].

The second to 15th index values (0100110-0110011) in the second index range (0100101-0110100) may correspond to 39th to 52nd RUs (RU39 to RU52) sequentially arranged in the left-to-right direction.

Likewise, the 16th index value (0110100) in the second index range (0100101-0110100) may correspond to a 53rd RU (RU53) located next to the rightmost guard band including 11 tones. The 53rd RU (RU53) may be construed, for example, as a subcarrier set of [448: 499].

In this case, the 38th to 53rd RUs (RU38 to RU53) may be referred to as RUs with a second size.

Referring to Table 1, eight 106-units (i.e., units each corresponding to 106 tones) illustrated in FIG. 6 may be indicated based on the third index range (0110101-0111100).

For example, the first index value (0110101) in the third index range (0110101-0111100) may correspond to a 54th RU (RU54) located next to the leftmost guard band including 12 tones. The 54th RU (RU54) may be construed, for example, as a subcarrier set of [−499: −394].

The second to seventh index values (0110110-0111011) in the third index range (0110101-0111100) may correspond to 55th and 60th RUs (RU55 and RU60) sequentially arranged from the left-to-right direction.

Likewise, the eighth index value (0111100) in the third index range (0110101-0111100) may correspond to a 61st RU (RU61) located next to the rightmost guard band including 11 tones. The 61st RU (RU61) may be construed, for example, as a subcarrier set of [394: 499].

In this case, the 54th to 61st RUs (RU54 to RU61) may be referred to as RUs with a third size.

Referring to Table 1, four 242-units (i.e., units each corresponding to 242 tones) illustrated in FIG. 6 may be indicated based on the fourth index range (0111101-1000000).

For example, the first index value (0111101) in the fourth index range (0111101-1000000) may correspond to a 62nd RU (RU62). The 62nd RU (RU62) may be construed, for example, as a subcarrier set of [−499: −258].

The second and third index values (0111110 and 0111111) in the fourth index range (0111101-1000000) may correspond to 63rd and 64th RUs (RU63 and RU64) sequentially arranged from the left-to-right direction.

Likewise, the fourth index value (1000000) in the fourth index range (0111101-1000000) may correspond to a 65th RU (RU65). The 65th RU (RU65) may be construed, for example, as a subcarrier set of [258: 499].

In this case, the 62nd to 65th RUs (RU62 to RU65) may be referred to as RUs with a fourth size.

Referring to Table 1, one 484-unit (i.e., a unit corresponding to 484 tones) illustrated in FIG. 6 may be indicated based on the fifth index range (1000001-1000010).

For example, the first index value (1000001) in the fifth index range (1000001-1000010) may correspond to a 66th RU (RU66). The 66th RU (RU66) may be construed, for example, as a subcarrier set of [−499: −16].

Likewise, a second index value (1000010) in the fifth index range (1000001-1000010) may correspond to a 67th RU (RU67). The 67th RU (RU67) may be construed, for example, as a subcarrier set of [16: 499].

In this case, the 66th and 67th RUs (RU66 and RU67) may be referred to as RUs with a fifth size.

Referring to Table 1, one 996-unit (i.e., a unit corresponding to 996 tones) illustrated in FIG. 6 may be indicated based on an index value 1000011 for a sixth index range.

The index value (1000011) for the sixth index range may correspond to a 68th RU (RU68). The 68 th RU (RU 68 may be construed, for example, as a subcarrier set of [−499: −2: 2: 499]. In this case, the 68th RU (RU68) may be referred to as an RU with a sixth size.

Referring to FIG. 6 and Table 1, an example of a 160 MHz PPDU and an 80+80 MHz PPDU transmitted in response to the basic trigger frame (TF) is described.

An index value (1000100) in Table 1 may be allocated to the RU Allocation field 1120 for the basic trigger frame (TF). An RU corresponding to the 160 MHz PPDU and the 80+80 MHz PPDU may be referred to as an RU with a seventh size.

Hereinafter, a specific embodiment of the RU Allocation field 1120 of FIG. 11 for an MU RTS frame according to the present embodiment will be described based on the content of the basic trigger frame.

A CTS frame may be received separately from each user STA identified by the MU RTS frame. The CTS frame may be received through an RU (i.e., a primary channel) indicated by the RU Allocation field 1120, which is separately allocated for each user STA in the MU RTS frame.

Specifically, the RU Allocation field 1120 of the MU RTS frame according to the present embodiment may indicate through which channel the CTS frame is transmitted among a primary 20 MHz channel, a primary 40 MHz channel, a primary 80 MHz channel, a 160 MHz channel, and an 80+80 MHz channel.

A particular bit B12 of the eight bits allocated for the RU Allocation field 1120 for the MU RTS frame may be allocated 0 to indicate the primary 20 MHz channel, the primary 40 MHz channel, and the primary 80 MHz channel. Also, 1 may be allocated to indicate the 160 MHz channel and the 80+80 MHz channel.

Seven bits (B19-B13) of the RU Allocation field 1120 for the MU RTS frame may be related to the BW field 1050 included in the common information field 950 of the trigger frame.

It may be assumed that the BW field 1050 indicates a 20 MHz bandwidth. In this case, the primary 20 MHz channel for a 20 MHz PPDU may be allocated the first index value (0111101) in the fourth index range (0111101-1000000) in Table 1.

It may be assumed that the BW field 1050 indicates a 40 MHz bandwidth. In this case, the primary 40 MHz channel for a 40 MHz PPDU may be allocated the first index value (1000001) in the fifth index range (1000001-1000010).

In one example, when the primary 20 MHz channel is a lowest frequency 20 MHz channel (i.e., CH1 in FIG. 15), the primary 20 MHz channel may be allocated the first index value (0111101) in the fourth index range (0111101-1000000) in Table 1.

In another example, when the primary 20 MHz channel is a second lowest frequency 20 MHz channel (i.e., CH2 in FIG. 15), the primary 20 MHz channel may be allocated the second index value (0111110) in the fourth index range (0111101-1000000) in Table 1.

It may be assumed that the BW field 1050 indicates an 80 MHz bandwidth. In this case, the primary 80 MHz channel (i.e., CH7 in FIG. 15) for an 80 MHz PPDU may be allocated the index value (1000011) in the sixth index range.

In one example, when the primary 20 MHz channel is a lowest frequency 20 MHz channel (i.e., CH1 in FIG. 15), the primary 20 MHz channel may be allocated the first index value (0111101) in the fourth index range (0111101-1000000) in Table 1.

In another example, when the primary 20 MHz channel is a second lowest frequency 20 MHz channel (i.e., CH2 in FIG. 15), the primary 20 MHz channel may be allocated the second index value (0111110) in the fourth index range (0111101-1000000) in Table 1.

In still another example, when the primary 20 MHz channel is a third lowest frequency 20 MHz channel (i.e., CH3 in FIG. 15), the primary 20 MHz channel may be allocated the third index value (0111111) in the fourth index range (0111101-1000000) in Table 1.

In yet another example, when the primary 20 MHz channel is a fourth lowest frequency 20 MHz channel (i.e., CH4 in FIG. 15), the primary 20 MHz channel may be allocated the fourth index value (1000000) in the fourth index range (0111101-1000000) in Table 1.

Further, in one example, when the primary 40 MHz channel is a lowest frequency 40 MHz channel (i.e., CH5 in FIG. 15), the primary 40 MHz channel may be allocated the first index value (1000001) in the fifth index range (1000001-1000010) in Table 1.

In another example, when the primary 40 MHz channel is a second lowest frequency 40 MHz channel (i.e., CH6 in FIG. 15), the primary 40 MHz channel may be allocated the second index value (1000010) in the fifth index range (1000001-1000010) in Table 1.

It may be assumed that the BW field 1050 indicates an 80+80 MHz bandwidth or a 160 MHz bandwidth. In this case, the RU Allocation field 1120 of the MU RTS frame for an 80+80 MHz PPDU or a 160 MHz PPDU may be allocated the index value (1000100) in the seventh index range (1000100) in Table 1.

Although Table 1 illustrated above includes the first to seventh index ranges, this is merely an example. According to the present specification, it is understood that the RU Allocation field may be set based on a greater number of index ranges (or a smaller number of index ranges).

Although it has been made to allocate different values in the first to seventh index ranges in Table 1 according to the positions of the primary channels, it will be understood that the present specification may also include a method of allocating one representative index value in each index range in Table 1 regardless of the positions of the primary channels.

Referring to FIGS. 1 to 15, in a first period (T1 to T2), the AP 1500 may transmit an MU RTS frame 1501 through the first to fourth channels (CH1 to CH4). For example, the MU RTS frame may be a frame included in a duplicated PPDU and transmitted through the first to fourth channels (CH1 to CH4).

The MU RTS frame 1501 of FIG. 15 may include a per user information field (e.g., 960#1 and 960#2) as illustrated above in FIG. 13. The per user information field may include identification information indicating a receiving STA.

Further, an RU Allocation field (e.g., 1120), which indicates an uplink channel for a CTS frame to be transmitted from the individual receiving STA in response to the MU RTS frame 1501, may be included in each per user information field (e.g., 960#1 and 960#2).

For example, the first STA 1510 and the second STA 1520 may be indicated by the identification information included in the per user information field (e.g., 960#1 and 960#2) of each MU RTS frame.

For the clear and concise understanding of FIG. 15, it is assumed that the primary 20 MHz channel is located in the second lowest frequency 20 MHz channel (i.e., CH2 in FIG. 15). It is also assumed that the BW field 1050 of the MU RTS frame 1501 indicates an 80 MHz bandwidth.

In this case, the seven bits (B19-B13) of the RU Allocation field (e.g., 1120) included in the per user information field (e.g., 960#1) for the first STA 1510 may be set to the second index value (0111110) in the fourth index range (0111101-1000000) in Table 1 in order to indicate the second lowest frequency 20 MHz channel (i.e., CH2 in FIG. 15).

Also, the seven bits (B19-B13) of the RU Allocation field (e.g., 1120) included in the per user information field (e.g., 960#2) for the second STA 1520 may be set to the first index value (1000001) in the fifth index range (1000001-1000010) in Table 1 in order to indicate the lowest frequency 40 MHz channel (i.e., CH5 in FIG. 15).

A second period (T2 to T3) may be an SIFS.

In a third period (T3 to T4), each STA may transmit a CTS frame through a separately allocated channel in response to the MU RTS frame 1501.

For example, the first STA 1510 may transmit a CTS frame 1511 via the second lowest frequency 20 MHz channel (i.e., CH2 in FIG. 15). The second STA 1520 may transmit a CTS frame 1521 via the lowest frequency 40 MHz channel (i.e., CH5 in FIG. 15).

The first and second CTS frames 1511 and 1521 transmitted in the third period (T3 to T4) may be transmitted via a non-HT PPDU or a non-HT duplicate PPDU.

Although not shown in FIG. 15, the WLAN system may perform uplink transmission for multiple users based on a basic trigger frame transmitted by the AP or may perform downlink transmission for multiple users by transmitting a buffered multi-user frame to the AP.

According to the present embodiment, in an operation of exchanging an MU-RTS frame and a CTS frame to protect multi-user transmission, it is possible to accurately indicate the position of a primary channel for transmitting the CTS frame a user STA receiving the MU-RTS frame. Accordingly, a WLAN system with improved performance may be provided.

Figure 16:
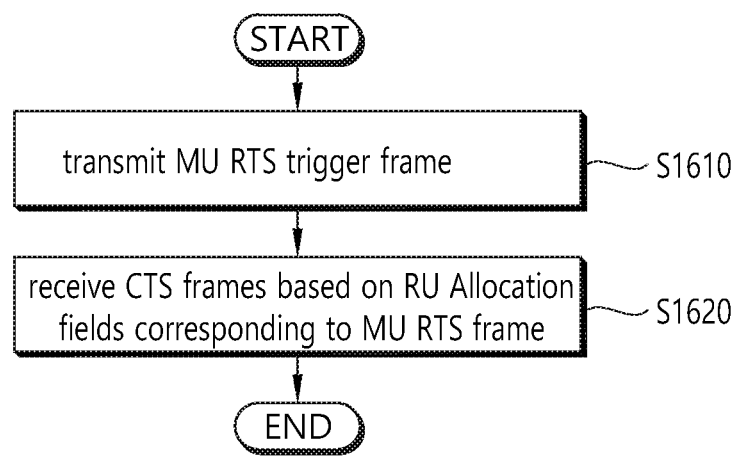
FIG. 16 is a flowchart illustrating a method for transmitting a frame in a WLAN system according to one embodiment.

FIG. 16 is a flowchart illustrating a method for transmitting a frame in a WLAN system according to one embodiment.

Referring to FIGS. 1 to 16, in step S1610, a wireless terminal may transmit a trigger frame including identification information for a plurality of user STAs and resource information indicating an RU separately allocated for the plurality of user STAs.

For example, when the trigger frame is a basic trigger frame, the resource information may be set based on first to seventh index ranges corresponding to RUs with first to seventh sizes in order to indicate a plurality of RUs for uplink transmission.

Further, when the trigger frame is an MU RTS frame, the resource information may be set based on first to fourth index values (0111101-1000000) in the fourth index range (0111101-1000000) in Table 1 in order to indicate a primary 20 MHz channel for transmitting a CTS frame, which is a response to the MU RTS frame.

Further, the resource information may be set based on fifth and sixth index values (1000001 and 1000010) in the fifth index range (1000001-1000010) in order to indicate a primary 40 MHz channel.

In addition, the resource information may be set based on a seventh index value (1000011) in the sixth index range (1000011) in order to indicate a primary 80 MHz channel.

For example, the RU with the first size may include 26 subcarriers. The RU with the second size may include 52 subcarriers. The RU with the third size may include 106 subcarriers.

The RU with the fourth size may include 242 subcarriers. The RU with the fifth size may include 484 subcarriers. The RU with the sixth size may include 996 subcarriers. The RU with the seventh size may include 2×996 subcarriers.

For example, the first index range may include 37 RUs with the first size. The second index range may include 16 RUs with the second size. The third index range may include eight RUs with the third size.

The fourth index range may include four RUs with the fourth size. The fifth index range may include two RUs with the fifth size. The sixth index range may include one RU with the sixth size. The seventh index range may include one RU with the seventh size.

For example, when the primary 20 MHz channel is a lowest frequency 20 MHz channel (i.e., CH1 in FIG. 15), the resource information may be set to the first index value (0111101).

When the primary 20 MHz channel is a second lowest frequency 20 MHz channel (i.e., CH2 in FIG. 15), the resource information may be set to the second index value (0111110).

When the primary 20 MHz channel is a third lowest frequency 20 MHz channel (i.e., CH3 in FIG. 15), the resource information may be set to the third index value (0111111).

When the primary 20 MHz channel is a fourth lowest frequency 20 MHz channel (i.e., CH4 in FIG. 15), the resource information may be set to the fourth index value (1000000).

In another example, when the primary 40 MHz channel is a lowest frequency 40 MHz channel (i.e., CH5 in FIG. 15), the resource information may be set to the fifth index value (1000001).

When the primary 40 MHz channel is a second lowest frequency 40 MHz channel (i.e., CH6 in FIG. 15), the resource information may be set to the sixth index value (1000010)

In still another example, the resource information may be set to the seventh index value (1000011) for the primary 80 MHz channel (i.e., CH7 in FIG. 15).

In addition, when the trigger frame is the MU RTS frame, the resource information may be set based on an eighth index value (1000100) in the seventh index range (1000100) in order to indicate a 160 MHz channel or an 80+80 MHz channel for transmitting the CTS frame.

For example, when the trigger frame is the MU RTS frame, the first index range (0000000-0100100) to the third index range (0110101-0111100) in Table 1 may be reserved.

In step S1620, the wireless terminal may receive a plurality of CTS frames separately transmitted from the plurality of user STAs. For example, the plurality of user STAs may be receiving terminals identified by the MU RTS frame.

For example, the plurality of CTS frames may be understood as frames transmitted by the receiving terminals identified by the MU RTS frame based on the resource information described in step S1610.

Figure 17:
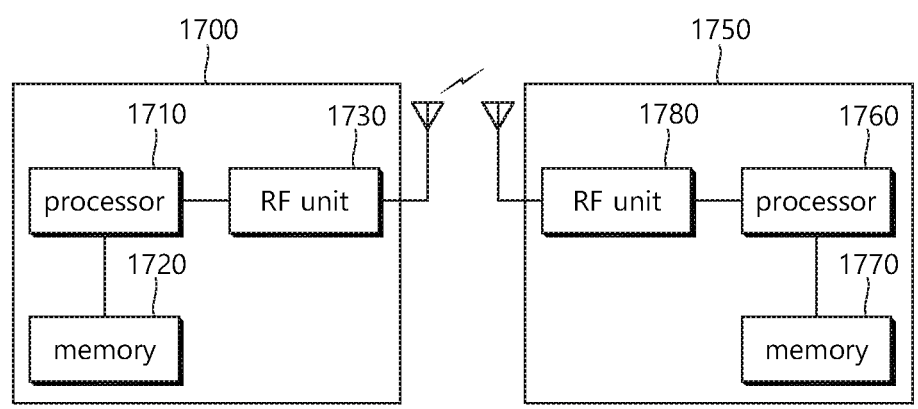
FIG. 17 is a block diagram illustrating a wireless device according to one embodiment.

FIG. 17 is a block view illustrating a wireless device to which the exemplary embodiment of the present invention can be applied.

Referring to FIG. 17, as an STA that can implement the above-described exemplary embodiment, the wireless device may correspond to an AP or a non-AP station (STA). The wireless device may correspond to the above-described user or may correspond to a transmitting device transmitting a signal to the user.

The AP (1700) includes a processor 1710, a memory 1720, and a radio frequency (RF) unit 1730.

The RF unit 1730 is connected to the processor 1710, thereby being capable of transmitting and/or receiving radio signals.

The processor 1710 implements the functions, processes, and/or methods proposed in the present invention. For example, the processor 1710 may be implemented to perform the operations according to the above-described exemplary embodiments of the present invention. More specifically, among the operations that are disclosed in the exemplary embodiments of FIG. 1 to FIG. 25, the processor 1710 may perform the operations that may be performed by the AP.

The non-AP STA 1750 includes a processor 1760, a memory 1770, and a radio frequency (RF) unit 1780.

The RF unit 1780 is connected to the processor 1760, thereby being capable of transmitting and/or receiving radio signals.

The processor 1760 implements the functions, processes, and/or methods proposed in the present invention. For example, the processor 1760 may be implemented to perform the operations of the non-AP STA according to the above-described exemplary embodiments of the present invention. The processor may perform the operations of the non-AP STA, which are disclosed in the exemplary embodiments of FIG. 1 to FIG. 16.

The processor 1710 and 1760 may include an application-specific integrated circuit (ASIC), another chip set, a logical circuit, a data processing device, and/or a converter converting a baseband signal and a radio signal to and from one another. The memory 1720 and 1770 may include a read-only memory (ROM), a random access memory (RAM), a flash memory, a memory card, a storage medium, and/or another storage device. The RF unit 1730 and 1780 may include one or more antennas transmitting and/or receiving radio signals.

When the exemplary embodiment is implemented as software, the above-described method may be implemented as a module (process, function, and so on) performing the above-described functions. The module may be stored in the memory 1720 and 1770 and may be executed by the processor 1710 and 1760. The memory 1720 and 1770 may be located inside or outside of the processor 1710 and 1760 and may be connected to the processor 1710 and 1760 through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for transmitting a frame in a wireless local area network (WLAN) system, the method comprising:

transmitting, by a wireless terminal, a trigger frame including identification information for a plurality of user stations (STAs) and resource information indicating a resource unit (RU) individually allocated for the plurality of user STAs,
wherein: when the trigger frame is a basic trigger frame, the resource information is set based on first to seventh index ranges corresponding to RUs with first to seventh sizes in order to indicate a plurality of RUs for uplink transmission; and
when the trigger frame is a multi-user Request to Send (MU RTS) frame, the resource information is set based on first to fourth index values in the fourth index range in order to indicate a primary 20 MHz channel for transmitting a Clear to Send (CTS) frame, which is a response to the MU RTS frame, is set based on fifth and sixth index values in the fifth index range in order to indicate a primary 40 MHz channel for transmitting the CTS frame, and is set based on a seventh index value in the sixth index range in order to indicate a primary 80 MHz channel for transmitting the CTS frame.

2. The method of claim 1, wherein an RU with the first size comprises 26 subcarriers,
an RU with the second size comprises 52 subcarriers, a RU with the third size comprises 106 subcarriers,
an RU with the fourth size comprises 242 subcarriers,
an RU with the fifth size comprises 484 subcarriers,
an RU with the sixth size comprises 996 subcarriers, and
an RU with the seventh size comprises 2×996 subcarriers.

3. The method of claim 2, wherein the first index range comprises 37 RUs with the first size,
the second index range comprises 16 RUs with the second size,
the third index range comprises eight RUs with the third size,
the fourth index range comprises four RUs with the fourth size,
the fifth index range comprises two RUs with the fifth size,
the sixth index range comprises one RU with the sixth size, and
the seventh index range comprises one RU with the seventh size.

4. The method of claim 2, wherein when the trigger frame is the MU RTS frame, the first index range to the third index range are reserved.

5. The method of claim 1, wherein: when the primary 20 MHz channel is a lowest frequency 20 MHz channel, the resource information is set to the first index value; and
when the primary 20 MHz channel is a second lowest frequency 20 MHz channel, the resource information is set to the second index value.

6. The method of claim 1, wherein: when the primacy 20 MHz channel is a third lowest frequency 20 MHz channel, the resource information is set to the third index value; and
when the primary 20 MHz channel is a fourth lowest frequency 20 MHz channel, the resource information is set to the fourth index value.

7. The method of claim 1, wherein: when the primary 40 MHz channel is a lowest frequency 40 MHz channel, the resource information is set to the fifth index value; and
when the primary 40 MHz channel is a second lowest frequency 40 MHz channel, the resource information is set to the sixth index value.

8. The method of claim 1, wherein the resource information is set to the seventh index value for the primary 80 MHz channel.

9. The method of claim 1, wherein when the trigger frame is the MU RTS frame, the resource information is set based on an eighth index value in the seventh index range in order to indicate a 160 MHz channel or an 80+80 MHz channel for transmitting the CTS frame.

10. The method of claim 1, further comprising:
receiving, by the wireless terminal, the CTS frame transmitted separately from the plurality of user STAs.

11. A wireless terminal using a method for transmitting a frame in a wireless local area network (WLAN) system, the wireless terminal comprising:
a transceiver to transmit and receive a radio signal; and
a processor connected to the transceiver,
wherein: the processor is configured to transmit a trigger frame including identification information for a plurality of user stations (STAs) and resource information indicating a resource unit (RU) individually allocated for the plurality of user STAs;
when the trigger frame is a basic trigger frame, the resource information is set based on first to seventh index ranges corresponding to RUs with first to seventh sizes in order to indicate a plurality of RUs for uplink transmission; and
when the trigger frame is a multi-user Request to Send (MU RTS) frame, the resource information is set based on first to fourth index values in the fourth index range in order to indicate a primary 20 MHz channel for transmitting a Clear to Send (CTS) frame, which is a response to the MU RTS frame, is set based on fifth and sixth index values in the fifth index range in order to indicate a primary 40 MHz channel for transmitting the CTS frame, and is set based on a seventh index value in the sixth index range in order to indicate a primary 80 MHz channel for transmitting the CTS frame.

* * * * *